RECEIVER FOR REMOTE SUPERVISORY AND CONTROL SYSTEMS

Filed Dec. 26, 1952 2 Sheets-Sheet 1

RECEIVER RE 1800-A

INVENTORS:
JOHN I. BELLAMY
PAUL W. HEMMINGER
BY John I. Bellamy
ATTORNEY

Sept. 7, 1954 J. I. BELLAMY ET AL 2,688,738

RECEIVER FOR REMOTE SUPERVISORY AND CONTROL SYSTEMS

Filed Dec. 26, 1952 2 Sheets-Sheet 2

INVENTORS
JOHN I. BELLAMY
PAUL W. HEMMINGER
BY John I. Bellamy
ATTORNEY

Patented Sept. 7, 1954 2,688,738

UNITED STATES PATENT OFFICE 2,688,738

RECEIVER FOR REMOTE SUPERVISORY AND CONTROL SYSTEMS

John I. Bellamy, Wheaton, and Paul W. Hemminger, Franklin Park, Ill., assignors to International Telephone and Telegraph Corporation, a corporation of Maryland Application December 26, 1952, Serial No. 328,114

2 Claims. (Cl. 340—147)

This invention relates to a receiver for a remote supervisory and control system. Its principal object is to provide a simple and reliable receiver for responding to received two-digit numbers by selectively energizing corresponding local wires.

This application is a continuation in part of the receiver portion of our prior application for a remote supervisory and control system, Serial No. 231,584, filed June 14, 1951, hereinafter termed the parent application.

A feature concerned with the carrying out of the above noted object resides in an arrangement whereby two single-motion stepping switches connected in tandem respond respectively to the series of impulses representing the digits of a two-digit number to select the corresponding one of a number of local control conductors comprising the product of the steps required to be taken by the respective switches.

A further feature relates to the arrangement whereby the bank of the second switch is divided longitudinally into two sections, with one section or the other being rendered effective according to the value of the first digit of a received two-digit number, thereby permitting the number of levels in the second switch to be no more than half the maximum number of impulses in the corresponding series.

A related feature resides in the arrangement whereby each level of the second switch is assigned two separate digit values, one for each section of the bank, coupled with an arrangement for pre-advancing the brushes of the second switch to the second bank section, or not, depending upon the setting of the first switch.

Other objects and features will appear as the description progresses.

*General description*

The accompanying drawings, comprising Figs. 1 and 2, show a preferred embodiment of the invention. Fig. 1 shows a circuit diagram of the receiver control section together with the tens selector switch, and Fig. 2 shows the receiver rotary switch.

The selector switch of Fig. 1 is a single-motion switch similar to the so-called minor switch shown in Fig. 1, page 83, of Miller, "Telephone Theory and Practice," volume 3, while the rotary switch shown in Fig. 2 is similar to the rotary switch shown in Fig. 30, page 49 of the noted Miller publication.

As disclosed in our noted prior application, receiver RE1800–A receives two-digit code numbers over transmission line OC–A from the sender and responds to these control indications by energizing the selected one of the output wires according to the received code number.

RE1800–A includes six relays which perform their respective functions as follows:

1. Line relay 800 which operates and restores according to the closing and the opening of the line loop across transmission OC–A;
2. Release relay 801 which operates responsive to the receiver RE1800–A being taken for use by the closing of the loop across transmission line OC–A and remains operated until the receiver is released;
3. Series relay 802 which operates at the start of the dialing of each digit and remains operated until the dialing of the digit is completed;
4. Transfer relay 803 which operates on the completion of dialing of the first digit to transfer the switch pulsing wire from the first switch to the second switch;
5. Transfer relay 804 which operates on the start of the dialing of the second digit to open the homing circuit of the second switch; and
6. Transfer relay 805 which operates on the completion of the dialing of the second digit to energize the selected local wire.

Switch 815 includes a stepping magnet SM815, a release magnet RM815, and off-normal contacts ON.

Switch 816 includes six brushes 821 to 826 which are advanced over the contact bank on the back stroke of stepping magnet SM816, the 26-point contact bank having the usual semicircular configuration, with double-ended brushes.

*Detailed description*

Figure 1:
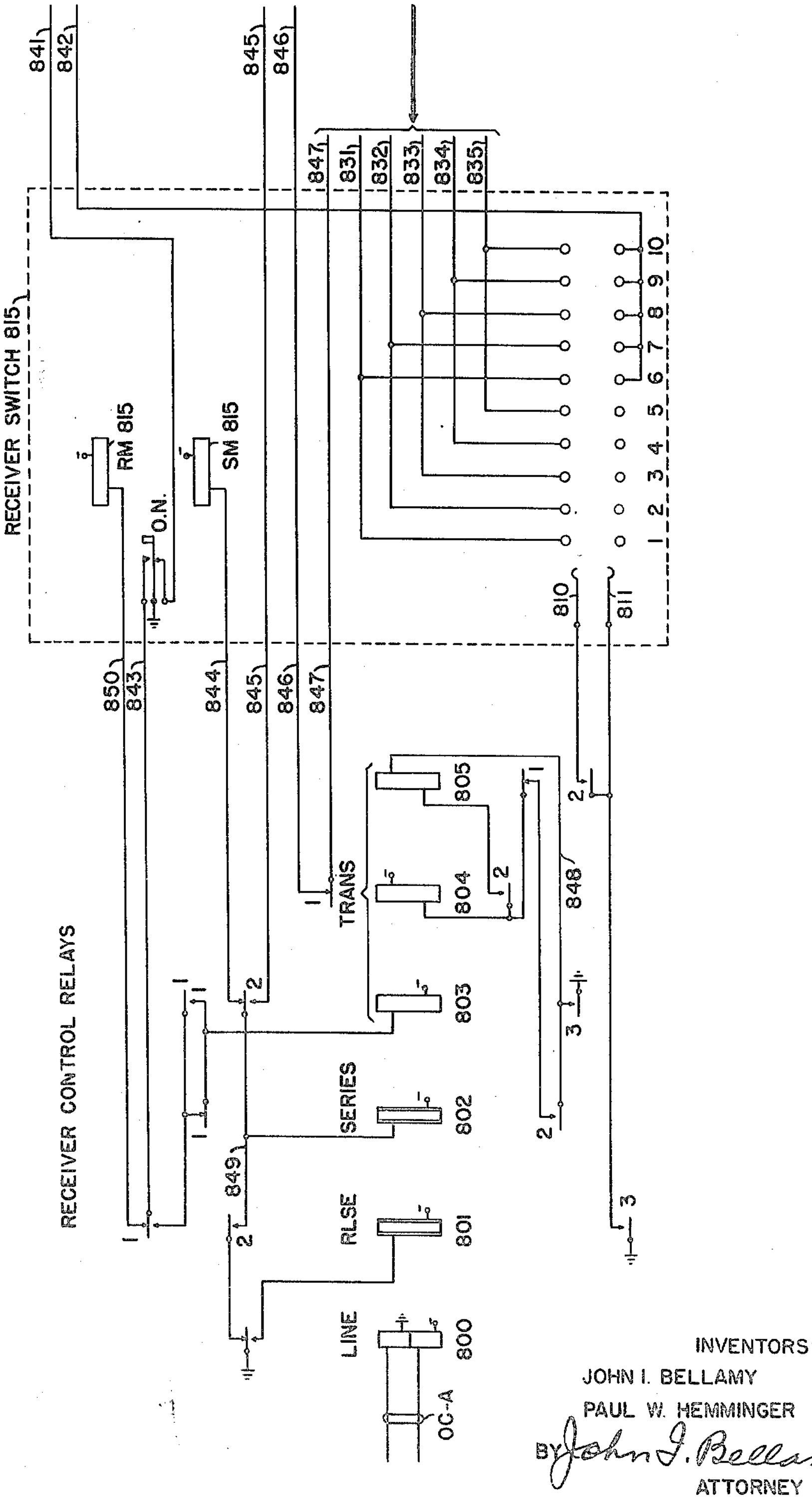
Figure 2:
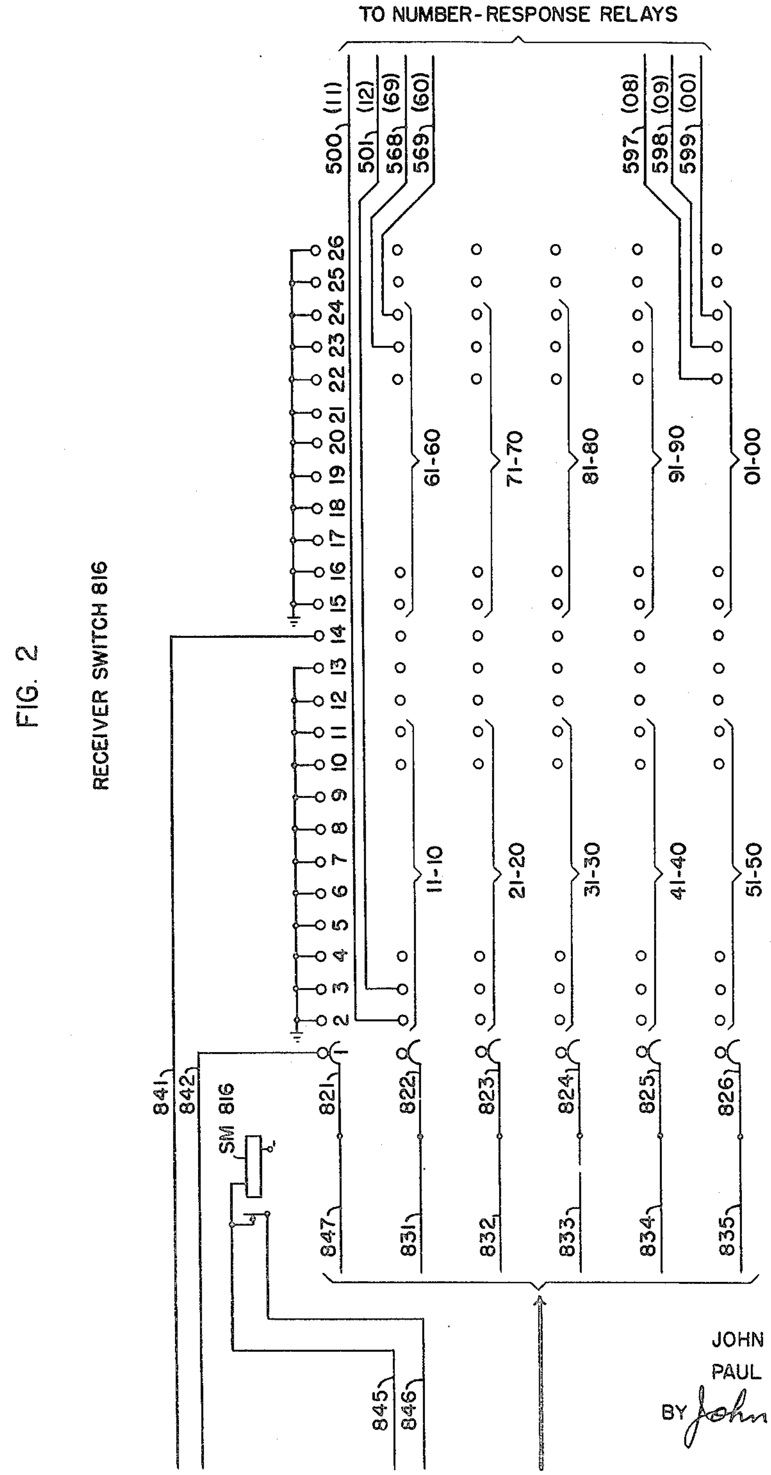

The operation of receiver RE1800–A in exercising control over the bank wires according to received two-digit code numbers will now be described.

To take receiver RE1800–A for use, the line loop across transmission line OC–A is closed for the seizing time interval determined by the sender of the noted parent application and is thereafter opened and closed to transmit the first digit to the receiving equipment. The line loop is then closed for the inter-digit interval, and thereafter is again opened and closed to transmit the second digit. After the second digit is completely transmitted to the receiver, the line loop is held closed for the switch-through time interval and then opened to release the receiver and permit it to clear out.

Assuming that the transmitter transmits the two digits, 6 and 9, the operation of receiver RE1800-A in energizing wire 568 is as follows.

When the line loop is closed across transmission line OC-A, current flow through the battery and ground connected windings of line relay 800, operates line relay 800. Contacts on relay 800 operates release relay 801, which at its contacts 3 extend ground potential to brush 811 of switch 815; at its contacts 2 prepare an operate circuit for the magnet of switch 815; and at its contacts 1 prepare an operate circuit for relay 803. The receiver is now in a seized condition and ready to receive the two-digit number 69.

After the seizing time interval has elapsed, as described in the noted parent application, the line loop is opened for the first pulse of the first digit. Relay 800 thereupon restores for the pulse period time of approximately 50 milliseconds (as determined by the sender of the parent application) and extends ground potential through make contacts 2 of relay 801 and over pulse wire 849 to the battery-connected winding of series relay 802. This ground potential is also extended through break contacts 2 of relay 803 and over wire 844 to the winding of magnet SM815.

Series relay 802 operates and magnet SM815 of switch 815 advances brushes 810 and 811 to position 1. Off-normal contacts ON of switch 815 remove ground potential from wire 841 to provide a homing stop (absence of ground on a homing contact) for switch 816.

When the line loop is closed upon completion of the sender transmission of the first pulse of the first digit, relays 801 and 802 remain operated for a time interval greater than the time interval between pulses of any one digit, these relays being slow-releasing relays.

The remainder of the pulses of the six pulses constituting the first digit restore and reoperate line relay 800, placing a pulse of ground potential on driving wire 849 each time relay 800 restores. During this time, relays 801 and 802 remain operated and magnet SM815 advances brushes 810 and 811 one step on each pulse, thereby setting them in position 6 on completion of the sixth pulse of the first digit.

When brush 811 of switch 815 assumes position 6, ground potential from contacts 3 of relay 801 is extended over wire 842 to contact 1 of the bank of switch 816. This ground is extended through brush 821, over wire 847, through contacts 1 of relay 804, over wire 847, through contacts 1 of relay 804, and over wire 846 to the battery-connected winding of magnet SM816 through its homing contacts, thereby advancing the switch 816 to position 2. Contacts 2 to 13 of the first level of switch 816 (the level associated with brush 821) cause switch 816 to home to position 14 in the well-known manner. Upon reaching position 14 with off-normal contacts ON open by the described operation of switch 815, the homing operation of switch 816 is terminated as no driving ground is present on brush 821. At this time, brushes 822 to 826 are positioned in readiness for advancement over the second section of the divided bank.

Since six pulses constituted the first digit, the line loop is closed for the inter-digit time interval as described in the parent application. This interval of time is greater than the slow-release time of relay 802, and relay 802 restores. During this time interval, switch 816 homes its brushes to position 14 as described.

With the restoration of series relay 802, its contacts 1 extend ground potential from off-normal contacts ON to the battery-connected winding of relay 803 through make contacts 1 of operated release relay 801. Relay 803 operates and locks through its contacts 1 to its operate ground. Contacts 2 of relay 803 transfer the magent driving wire 849 from wire 844 extending to switch 815 to wire 845 extending to switch 816. Relays 800, 801 and 803 are operated and the receiver is prepared to receive the pulses of the second digit.

The opening of the line loop for the first pulse of the second digit restores relay 800, which at its contacts transmits a ground pulse over wire 849 to the winding of relay 802, operating it, and to the winding of stepping magnet SM816 over wire 845 through contacts 2 of relay 803.

The operation of relay 802 extends ground potential from make contacts 3 of relay 803, through its contacts 2 and the break contacts 1 of relay 805 to the battery-connected winding of relay 804. Relay 804 operates and at its contacts 2 prepares an operate circuit for relay 805 which is now shortcircuited. Contacts 1 open the homing circuit of switch 816 which has had more than sufficient homing time, to prevent it from immediately homing when it responds to the pulses of the second digit.

On completion of the first pulse of the second digit, switch 816 advances its brushes to position 15, the first position in the second half of the switch bank.

The remainder of the pulses of the second digit cause relay 800 to restore and reoperate, driving the brushes of switch 816 to position 23, the ninth position in the second half of the bank. During this pulsing time, relay 802 remained operated, maintaining relay 805 short-circuited.

On completion of the dialing of the second digit, relay 800 remains operated for the hereinbefore noted switch-through time, thereby restoring relay 802, as the switch-through time interval is greater than the holdover time of relay 802. At this point, switch 815 is in position 6 and switch 816 is in position 23. With the restoration of relay 802, the short-circuiting ground is removed from relay 805 and it operates in series with relay 804. The operating and locking circuit of relays 804 and 805 include contacts 2 of relay 804 and contacts 3 of relay 803.

Ground potential from contacts 3 of relay 801 is extended through contacts 2 of relay 805, through brush 810 of switch 815, contact 6 of switch 815, wire 831 extending to switch 816, and through brush 822 and contact 23 of switch 816 to output wire 568.

After the switch-through time interval has elapsed, the line loop across circuit OC-A is opened, thereby restoring relay 800. After the slow-release time of relay 801 has elapsed, it restores, extending the ground potential on wire 843 from off-normal contacts ON to the winding of release magnet RM815 of switch 815. Release magnet RM815 is energized thereby returning switch 815 to its home position. When switch 815 is returned to normal, the off-normal contacts ON are opened, deenergizing release magnet RM815. The restoration of relay 801 removes locking ground potential from relays 803, 804, and 805, restoring them.

With all relays restored and switch 816 in position 23, ground potential connected to contact 23 of the bank of switch 816 is extended over brush 821, wire 847, contacts 1 of restored relay 804, and wire 846 to the winding of magnet SM- 816 through its coming contacts. Since ground potential is on contacts 23 to 26, magnet SM816 advances to its stop position 1, which has no ground potential on it as make contacts 3 of relay 801 are open and switch 815 is in its illustrated position. All relays are restored and both switches are in home position. The receiver RE1800–A effected the necessary control over the selected output wire according to the received digits. Receiver RE–800A is now prepared to receive another call.

Assuming that the received two-digit number comprises digits in which the value of the first digit is less than 6, the operation of receiver RE1800–A in responding to such number will be described.

The operation of the receiver in responding to a two-digit number such as 39 is the same as described for responding to the two-digit number 69 up to the point where brushes 810 and 811 of switch 815 were advanced.

As line relay 800 restores and reoperates to generate three pulses, brushes 810 and 811 of switch 815 advance to switch bank position 3. As observed in Fig. 1 of the drawings, the first five contacts are unequipped and the ground appearing on brush 811 is ineffective.

Since wire 842 is connected to the last five contact points associated with brush 811, and brush 811 is in position 3, wire 842 is not energized and hence the brushes of switch 816 are not advanced.

The operation of relay 803 at the end of the receipt of the first digit and the operation of relay 804 at the start of the second digit is as previously described.

When relay 800 restores and reoperates responsive to received pulses from line OC–A, the pulses of ground generated at its contacts cause the brushes of switch 816 to advance. At this time, the brushes of switch 816 are associated with the first portion of the switch bank as noted, and are advanced from contact 1 to contact 10 responsive to the nine pulses of ground constituting the second digit of the received number.

When relay 800 comes to rest, operated at the end of the second digit, relay 802 restores and relay 805 operates as previously described. Contacts 2 of relay 805 extend ground potential to selected wire 549 (not shown) through contacts 3 of switch 815, wire 833, and brush 824.

The clearing out of receiver RE1800–A and related apparatus is as previously described with the exception of the homing of switch 816.

As previously described, when relay 804 restores responsive to the clearing out of the receiver, its contacts 1 connect wire 846 to wire 847 to cause switch 816 to home. Since ground is connected to contacts 2 to 13 associated with brush 821, switch 816 homes over its hereinbefore described homing circuit. If, at this time, switch 815 is completely restored, ground from off-normal contacts ON of switch 815 is extended over wire 841 to contact 14 of the first level of switch 816. Since contacts 2 to 26 now have ground potential connected to them, switch 816 homes to its illustrated position 1 in readiness for another call.

Briefly, receiver switch 816 maintains its brushes associated with the first portion of its bank when the value of the first digit is less than six and advances its brushes into association with the second portion of its bank when the value of the first received digit is greater than five.

We claim:

1. In a remote control system, a receiver including means responsive to two successive variable trains of impulses for delivering said impulse trains respectively over first and second local impulse conductors, a selector switch connected to the first local impulse conductor, a stepping switch having a stepping magnet connected to the second local conductor, the stepping switch having a contact bank comprising levels of contacts and having brushes for said levels respectively, the number of said brushes and levels being no more than half the maximum number of impulses in the first of said impulse trains, the number of contacts in any level being at least twice the maximum number of impulses in the second train of impulses, means causing the said brushes to occupy a normal fixed starting position with respect to the contacts in a first half of the bank, two separate numbers of impulses in the first train being assigned to each brush, means for causing said selector switch to respond to the said delivery of impulses over the first said local conductor by extending a connection to one of said brushes to which the number of impulses in the first train is assigned, means controlled by the selector device depending on the first train containing a specific predetermined one of the two numbers of impulses assigned to any brush for causing the stepping magnet of the stepping switch to advance its brushes along the contact bank a distance at least equal to that occupied by said first half of the bank, whereby the brushes then occupy a new fixed starting position related to the second half of the contact bank as the said normal fixed starting position is related to the first half of the bank, and means including said stepping magnet for advancing the said brushes responsive to the said delivery of impulses over the second said local conductor from either of said starting positions over the contacts of the concerned half of the bank into engagement with the respective contacts thereof which correspond in position to the number of impulses in the train delivered thereover.

2. In a remote control system as set forth in claim 1, the said specific predetermined number of impulses assigned to any brush being higher than the other number of impulses assigned to that brush or any other said brush, means in said selector device for rendering effective the said means for advancing the brushes of the stepping switch to its new starting position responsive to the delivery of the impulse over the first local conductor which corresponds to the lowest said specific predetermined number, the last said means becoming effective before arrival of the next impulses if the concerned train has not ended, and remaining effective thereafter during the interval between the said successive trains of impulses.

No references cited.